(12) United States Patent
Nozaki et al.

(10) Patent No.: US 8,212,894 B2
(45) Date of Patent: Jul. 3, 2012

(54) ELECTRONIC CAMERA HAVING A FACE DETECTING FUNCTION OF A SUBJECT

(75) Inventors: Hirotake Nozaki, Port Washington, NY (US); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 959 days.

(21) Appl. No.: 12/225,257

(22) PCT Filed: Apr. 3, 2007

(86) PCT No.: PCT/JP2007/000363
§ 371 (c)(1),
(2), (4) Date: Sep. 17, 2008

(87) PCT Pub. No.: WO2007/129438
PCT Pub. Date: Nov. 15, 2007

(65) Prior Publication Data
US 2009/0273667 A1    Nov. 5, 2009

(30) Foreign Application Priority Data

Apr. 11, 2006 (JP) .................................. 2006-109006

(51) Int. Cl.
*H04N 9/68* (2006.01)
(52) U.S. Cl. ................... 348/238; 348/239; 348/222.1
(58) Field of Classification Search .............. 348/238, 348/239, 222.1
See application file for complete search history.

(56) References Cited

U.S. PATENT DOCUMENTS

| | | | |
|---|---|---|---|
| 6,940,545 B1 * | 9/2005 | Ray et al. | 348/222.1 |
| 7,324,669 B2 | 1/2008 | Nakanishi et al. | |
| 2003/0189654 A1 * | 10/2003 | Kage et al. | 348/239 |
| 2004/0208114 A1 * | 10/2004 | Lao et al. | 369/125 |
| 2004/0228528 A1 * | 11/2004 | Lao | 382/167 |
| 2006/0008173 A1 | 1/2006 | Matsugu et al. | |

(Continued)

FOREIGN PATENT DOCUMENTS

JP    A-06-259534    9/1994

(Continued)

OTHER PUBLICATIONS

Shakhnarovich et al. "A Unified Learning Framework for Real Time Face Detection and Classification"; *Proceedings of the Fifth IEEE International Conference on Automatic Face and Gesture Recognition*; 2002.

(Continued)

*Primary Examiner* — Djenane Bayard
(74) *Attorney, Agent, or Firm* — Oliff & Berridge, PLC (57) ABSTRACT

An electronic camera includes an image pickup device that takes a subject image, a face detecting section, an inferential section, and an image processing section. The face detecting section not only detects a face area in a shooting image plane based on the output of the image pickup device but also extracts a feature amount of the face of the subject from the face area. The inferential section performs inferential processing relating to either of the age and gender of the subject based on the feature amount. The image processing section makes at least one of an exposure correction, a soft focus correction, a skin smoothing correction to adjust color saturation of the color of the skin, and a correction to make a person look slim, on a recording-purpose image taken by the image pickup device based on the inference result of the inferential section.

30 Claims, 3 Drawing Sheets

U.S. PATENT DOCUMENTS

| | | | |
|---|---|---|---|
| 2006/0153470 A1* | 7/2006 | Simon et al. | 382/254 |
| 2006/0245624 A1* | 11/2006 | Gallagher et al. | 382/118 |
| 2011/0025886 A1* | 2/2011 | Steinberg et al. | 348/239 |

FOREIGN PATENT DOCUMENTS

| | | |
|---|---|---|
| JP | A-2001-016573 | 1/2001 |
| JP | A-2004-222118 | 8/2004 |
| JP | A-2004-246456 | 9/2004 |
| JP | A-2004-264893 | 9/2004 |
| JP | A-2004-272933 | 9/2004 |
| JP | A-2005-049854 | 2/2005 |
| JP | A-2006-012062 | 1/2006 |

OTHER PUBLICATIONS

Hosoi et al.; "Gender and Adult Estimation System with Gabor Wavelet and Support Vector Machine"; *The Eighth Image Sensing Symposium Lecture Paper Collection*; Jul. 2002; pp. 243-246. (Abstract Only).

* cited by examiner

FIG. 3

ELECTRONIC CAMERA HAVING A FACE DETECTING FUNCTION OF A SUBJECT

CROSS-REFERENCE TO RELATED APPLICATION

This application is a U.S. National Stage application claims the benefit of prior filed International Application Number PCT/JP2007/000363, filed Apr. 3, 2007, in which the International Application claims a priority date of Apr. 11, 2006 based on prior filed Japanese Application Number 2006-109006, the entire contents of which are incorporated herein by reference.

TECHNICAL FIELD

The present invention relates to an electronic camera having a function of detecting a face of a subject in a shooting image plane.

BACKGROUND ART

Conventionally, a technique has been disclosed, in which features of a face of a person are extracted from a photographic image of the face of the person and the face is recognized based on the degree of agreement between face recognizing data relating to the person to be recognized and the features (refer to patent document 1). An image processing device has also been disclosed, in which a face image is corrected by estimating the race, age, and gender from a photographic image (refer to patent document 2). Recently, the number of functions of an electronic camera is increasing more and more and accompanying this, there is a trend for the operation of an electronic camera to become more complicated. Consequently, an electronic camera with which a user can use his/her desired function easily when shooting a person has been demanded.

Patent Document 1: Japanese Unexamined Patent Application Publication No. H06-259534

Patent Document 2: Japanese Unexamined Patent Application Publication No. 2004-246456

DISCLOSURE

Problems to be Solved

The present invention is intended to solve the above-described problems of the prior art. A proposition of the present invention is to provide an electronic camera capable of not only detecting a face of a subject when shooting a person but also performing processing a user requests easily based on the features of the face of the subject.

Means for Solving the Problems

An electronic camera according to a first invention includes an image pickup device that takes a subject image, a face detecting section, an inferential section, and an image processing section. The face detecting section not only detects a face area in a shooting image plane based on the output of the image pickup device but also extracts a feature amount of the face of the subject from the face area. The inferential section performs inferential processing relating to either one of the age and gender of the subject based on the feature amount. The image processing section makes at least one of an exposure correction, a soft focus correction, a skin smoothing correction to adjust color saturation of the color of the skin, and a correction to make a person look slim, on a recording-purpose image taken by the image pickup device based on the inference result of the inferential section.

An electronic camera according to a second invention includes an image pickup device that takes a subject image, a face detecting section, an inferential section, and a controlling section. The face detecting section not only detects a face area in a shooting image plane based on the output of the image pickup device but also extracts a feature amount of the face of the subject from the face area. The inferential section performs inferential processing relating to the age of the subject based on the feature amount. The controlling section changes the shooting setting when shooting a recording-purpose image by the image pickup device based on the inference result of the inferential section.

In a third invention, the controlling section makes a correction to make short the exposure time if the age of the subject inferred by the inferential section is not more than a threshold value in the second invention.

In a fourth invention, the electronic camera further includes an aperture section that controls the amount of incident light from a field in the second invention. Then, the controlling section controls the aperture section to make a correction to increase the depth of field if the age of the subject inferred by the inferential section is not more than a threshold value.

In a fifth invention, the electronic camera further includes a shooting lens and a lens driving section that adjusts the position of the shooting lens in an optical axis direction in the second invention. Then, the controlling section moves the shooting lens to a position suitable for close-range shooting if the age of the subject inferred by the inferential section is not more than a threshold value.

In a sixth invention, the electronic camera further includes a flash emitting section that illuminates a subject when shooting and a speaker that outputs sound to outside in the second invention. Then, the controlling section not only causes the flash emitting section to emit light but also outputs sound from the speaker when shooting if the age of the subject inferred by the inferential section is not more than a threshold value.

In a seventh invention, the electronic camera further includes a flash emitting section that illuminates a subject when shooting and a speaker that outputs sound to outside in the second invention. Then, the controlling section not only prohibits the flash emitting section from emitting light but also turns off the output of the speaker when shooting if the age of the subject inferred by the inferential section is not more than a threshold value.

In an eighth invention, the electronic camera further includes an expression estimating section that estimates the expression of the face of the subject based on the output of the image pickup device in the second invention. Then, the controlling section permits the shooting of the subject when the expression is in a predetermined state if the age of the subject inferred by the inferential section is not more than a threshold value.

In a ninth invention, the electronic camera further includes a first focusing section and a second focusing section in the second invention. The first focusing section performs a focusing operation by calculating a focus evaluation value of the subject image based on the output of the image pickup device and searching for a lens position at which the focus evaluation value becomes a local maximum. The second focusing section performs a focusing operation in a manner different from that of the first focusing section. Then, the controlling section performs the focusing operation by the second focusing section if the age of the subject inferred by the inferential section is not more than a threshold value.

In a tenth invention, the controlling section switches to a shooting mode in which continuous shooting of a recording-purpose image is carried out if the age of the subject inferred by the inferential section is not more than a threshold value in the second invention.

In an eleventh invention, the electronic camera further includes a microphone sound recording external sound in the second invention. Then, the controlling section switches to a shooting mode in which not only the shooting of a recording-purpose image but also recording is carried out if the age of the subject inferred by the inferential section is not more than a threshold value.

An electronic camera according to a twelfth invention includes an image pickup device that takes a subject image, a face detecting section, an inferential section, a memory, and an image processing section. The face detecting section not only detects a face area in a shooting image plane based on the output of the image pickup device but also extracts a feature amount of the face of the subject from the face area. The inferential section performs inferential processing relating to either of the age and gender of the subject based on the feature amount. The memory records data of an additional display including an image of character or text information. The image processing section performs image processing to synthesize the additional display for a recording-purpose image taken by the image pickup device based on the inference result of the inferential section.

An electronic camera according to a thirteenth invention includes an image pickup device that takes a subject image, a face detecting section, an inferential section, and a controlling section. The face detecting section not only detects a face area in a shooting image plane based on the output of the image pickup device but also extracts a feature amount of the face of the subject from the face area. The inferential section performs inferential processing relating to the age of the subject based on the feature amount. The controlling section generates print data for carrying out the printing of a recording-purpose image taken by the image pickup device based on the inference result of the inferential section.

An electronic camera according to a fourteenth invention includes an image pickup device that takes a subject image, a memory, a face detecting section, an inferential section, a first face recognizing section, and a second face recognizing section. The memory records a correspondence relation between registration data indicative of a feature amount of a face of a recognizing target and property data relating to any of the gender, race, and age of a person of the recognizing target. The face detecting section not only detects a face area in a shooting image plane based on the output of the image pickup device but also extracts a feature amount of the face of the subject from the face area. The inferential section performs inferential processing relating to either of the age and gender of the subject based on the feature amount. The first face recognizing section determines whether or not the face area is the recognizing target based on data of the feature amount corresponding to the face area and the registration data. The second face recognizing section determines whether or not the face area is the recognizing target based on the inference result of the inferential section and the property data.

An electronic camera according to a fifteenth invention includes an image pickup device that takes a subject image, a memory, a face detecting section, a face recognizing section, a speaker that outputs sound to outside, and a controlling section. The memory records a correspondence relation between registration data indicative of a feature amount of a face of a recognizing target and property data relating to the birthplace of or language used by a person of the recognizing target. The face detecting section not only detects a face area in a shooting image plane based on the output of the image pickup device but also extracts a feature amount of the face of the subject from the face area. The face recognizing section determines whether or not the face area is the recognizing target based on data of the feature amount corresponding to the face area and the registration data. The controlling section causes the speaker to output a cue determined in accordance with the property data when shooting based on the recognition result of the face recognizing section.

An electronic camera according to a sixteenth invention includes an image pickup device that takes a subject image, a memory, a face detecting section, a face recognizing section, a timer that acquires a shooting date and time, an image processing section, and a controlling section. The memory records a correspondence relation between registration data indicative of a feature amount of a face of a recognizing target and property data relating to one of the birthplace of and language used by a person of the recognizing target. The face detecting section not only detects a face area in a shooting image plane based on the output of the image pickup device but also extracts a feature amount of the face of the subject from the face area. The face recognizing section determines whether or not the face area is the recognizing target based on data of the feature amount corresponding to the face area and the registration data. The image processing section performs image processing to synthesize the display of the shooting date for a recording-purpose image taken by the image pickup device based on the recognition result of the face recognizing section. The controlling section changes the display order of the shooting date based on the property data.

An electronic camera according to a seventeenth invention includes an image pickup device that takes a subject image, a memory, a face detecting section, a face recognizing section, and a controlling section. The memory records a correspondence relation between registration data indicative of a feature amount of a face of a recognizing target and property data relating to the gender of a person of the recognizing target. The face detecting section not only detects a face area in a shooting image plane based on the output of the image pickup device but also extracts a feature amount of the face of the subject from the face area. The face recognizing section determines whether or not the face area is the recognizing target based on data of the feature amount corresponding to the face area and the registration data. The controlling section makes a correction to relax the criterion with which the face area is determined to be the recognizing target in the determination when the gender of the property data indicates a female.

An electronic camera according to an eighteenth invention includes an image pickup device that takes a subject image, a memory, a face detecting section, a face recognizing section, and a controlling section. The memory records a correspondence relation between registration data indicative of a feature amount of a face of a recognizing target and property data relating to the gender of a person of the recognizing target. The face detecting section not only detects a face area in a shooting image plane based on the output of the image pickup device but also extracts a feature amount of the face of the subject from the face area. The face recognizing section determines whether or not the face area is the recognizing target based on data of the feature amount corresponding to the face area and the registration data. The controlling section makes a correction to relax the criterion with which the face area is determined to be the recognizing target in the determination when the property data indicates a person who wears glasses.

An electronic camera according to a nineteenth invention includes an image pickup device that takes a subject image, a memory, a face detecting section, a face recognizing section, a timer that acquires a shooting date and time, and a controlling section. The memory records a correspondence relation between registration data indicative of a feature amount of a face of a recognizing target and property data relating to the birthday of a person of the recognizing target. The face detecting section not only detects a face area in a shooting image plane based on the output of the image pickup device but also extracts a feature amount of the face of the subject from the face area. The face recognizing section determines whether or not the face area is the recognizing target based on the feature amount data corresponding to the face area and the registration data. The controlling section adds data relating the number of years and months calculated from the birthday to the data of a recording-purpose image that shot the recognizing target based on the recognition result of the face recognizing section.

An electronic camera according to a twentieth invention includes an image pickup device that takes a subject image, a memory, a face detecting section, a face recognizing section, and an image processing section. The memory not only records the data of an additional display including an image of character or text information but also records a correspondence relation between registration data indicative of a feature amount of a face of a recognizing target and property data indicative of the additional display corresponding to the recognizing target. The face detecting section not only detects a face area in a shooting image plane based on the output of the image pickup device but also extracts a feature amount of the face of the subject from the face area. The face recognizing section determines whether or not the face area is the recognizing target based on data of the feature amount and the registration data corresponding to the face area. The image processing section performs image processing to synthesize the additional display indicated by the property data for a recording-purpose image taken by the image pickup device based on the recognition result of the face recognizing section.

In a twenty-first invention, the property data includes at least one of first data that specifies the kind of the additional display and second data that specifies the synthesizing position of the additional display in the twentieth invention. Then, the image processing section changes at least one of the kind of the additional display and the synthesizing position of the additional display in accordance with the recognizing target based on the property data.

An electronic camera according to a twenty-second invention includes an image pickup device that takes a subject image, a memory, a face detecting section, a face recognizing section, an image processing section, and a controlling section. The memory records a correspondence relation between registration data indicative of a feature amount of a face of a recognizing target and property data relating to at least one of the display setting of text information and the synthesizing position of the text information synthesized on an image when a person of the recognizing target is shot. The face detecting section not only detects a face area in a shooting image plane based on the output of the image pickup device but also extracts a feature amount of the face of the subject from the face area. The face recognizing section determines whether or not the face area is the recognizing target based on data of the feature amount corresponding to the face area and the registration data. The image processing section performs image processing to synthesize the text information for a recording-purpose image taken by the image pickup device based on the recognition result of the face recognizing section. The controlling section changes at least one of the display and the synthesizing position of the text information based on the property data.

According to the electronic camera of the present invention, it is possible not only to detect a face of a subject when shooting a person but also to perform processing a user requests easily based on the features of the face of the subject.

DETAILED DESCRIPTION OF THE EMBODIMENTS

Description of First Embodiment

Figure 1:
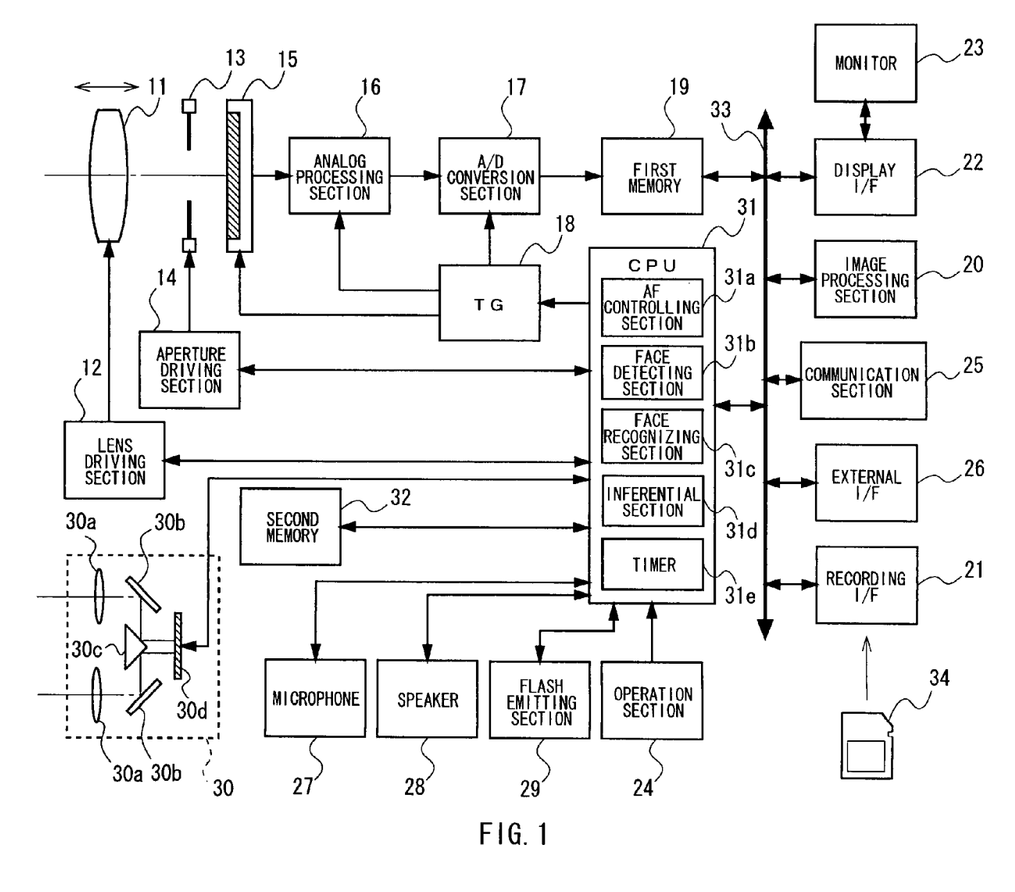
FIG. 1 is a block diagram showing a configuration of an electronic camera in a first embodiment.

FIG. 1 is a block diagram showing a configuration of an electronic camera in a first embodiment.

The electronic camera has a shooting lens 11, a lens driving section 12, an aperture 13, an aperture driving section 14, an image pickup device 15, an analog processing section 16, an A/D conversion section 17, a timing generator (TG) 18, a first memory 19, an image processing section 20, a recording I/F 21, a display I/F 22, a monitor 23, an operation section 24, a communication section 25, an external I/F 26, a microphone 27 and a speaker 28, a flash emitting section 29, an outer light AF section 30, a CPU 31, a second memory 32, and a system bus 33. The first memory 19, the image processing section 20, the recording I/F 21, the display I/F 22, the communication section 25, the external I/F 26, and the CPU 31 are connected via the system bus 33.

The shooting lens 11 is configured a plurality of groups of lenses including a zoom lens and a focus lens for focusing position adjustment. Each lens constituting the shooting lens 11 is moved in the optical axis direction by the lens driving section 12. The input and output of the lens driving section 12 are connected with the CPU 31.

The aperture 13 adjusts the amount of incident light from the shooting lens 11. The amount of opening of the aperture 13 is adjusted by the aperture driving section 14. The input and output of the aperture driving section 14 are connected with the CPU 31.

The image pickup device 15 carries out photoelectric conversion of the light flux having passed through the shooting lens 11 to generate an analog image signal of a subject image. In a shooting mode in which a subject is shot, the image pickup device 15 not only takes a photographic image for recording at the time of shooting but also outputs a through image by thinning-out reading at predetermined intervals during the period of shooting standby. The data of the above-described through image is used in various kinds of operation processing by the CPU 31 and in displays by the monitor 23.

The analog processing section 16 is an analog front end circuit that performs analog signal processing on the output of the image pickup device 15. The analog processing section 16 internally has a CDS circuit and a gain circuit. The CDS circuit of the analog processing section 16 reduces the noise component of the output of the image pickup device 15 by correlated double sampling. The gain circuit of the analog processing section 16 amplifies the gain of an input signal based on the instruction of the CPU 31. In the above-described gain circuit, it is possible to adjust the imaging sensitivity corresponding to the ISO sensitivity.

The A/D conversion section 17 carries out A/D conversion on the analog image signal output from the analog processing section 16. The output of the A/D conversion section 17 is connected with the first memory 19.

The TG 18 supplies a timing pulse to the image pickup device 15, the analog processing section 16, and the A/D conversion section 17 based on the instruction of the CPU 31. The drive timing of the image pickup device 15, the analog processing section 16, and the A/D conversion section 17 is controlled by the timing pulse of the TG 18.

The first memory 19 is a buffer memory used to temporarily store the data of an image in a pre-process and a post-process of image processing, to be described later.

The image processing section 20 generates a photographic image by performing various kinds of image processing on a digital image signal at the time of shooting in the above-described shooting mode. The image processing section 20 compresses the photographic image data in the JPEG format. Further, the image processing section 20 generates a display-purpose image (view image) from the image signal of the through image based on the instruction of the CPU 31 in the above-described shooting mode.

On the other hand, in an editing mode in which a photographic image is reproduced etc., the image processing section 20 performs processing to extend/restore the compressed photographic image data. Further, it is also possible for the image processing section 20 to perform image processing on the photographic image data in the above-described editing mode. The specific content of the image processing by the image processing section 20 will be described later.

In the recording I/F 21, a connector to connect a recording medium 34 is formed. The recording I/F 21 carries out write/read of the photographic image data to/from the recording medium 34 connected with the connector. The above-described recording medium 34 includes a hard disc, a memory card with a built-in semiconductor memory etc. In FIG. 1, a memory card is schematically shown as an example of the recording medium 34.

The display I/F 22 controls the display of the monitor 23 based on the instruction of the CPU 31. Further, the display I/F 22 has a video terminal to output an image outside. Consequently, it is also possible for the electronic camera in the present embodiment to display a reproduction image in an external display device (TV etc.) via the video terminal of the display I/F 22.

The monitor 23 displays various images in accordance with the instruction of the CPU 31 and the display I/F 22. The monitor 23 in the present embodiment is configured a liquid crystal monitor. On the monitor 23, a view image is displayed as a motion image at the time of shooting standby in the shooting mode. It is also possible for the monitor 23 to display a display of various pieces of information necessary for shooting (for example, the number of frames that can be used for shooting, the position of the focusing area, the frame display of a face area detected in face detecting processing, to be described later, etc.) on the view image in a overlapping manner by the on-screen function.

Further, it is also possible to display a reproduction image based on the photographic image data, a menu screen through which input in the form of graphical user interface (GUI) is possible on the monitor 23 (the view image and the menu screen in the monitor 23 are not shown schematically).

The operation section 24 has a release button, an operation button, etc. The release button of the operation section 24 receives an instruction input to start an exposing operation from a user. The operation button of the operation section 24 receives an input in the above-described menu screen etc., a switching input of the shooting modes of the electronic camera, etc., from a user.

The communication section 25 controls a communication with external devices in conformity with the specifications specified in the wireless LAN standards IEEE 802.11. For example, when transmitting photographic image data to an external device, the communication section 25 not only converts the photographic image data into data that can be transmitted via wireless communication but also transmits the converted data to the external device.

The external I/F 26 has a connection terminal conforming to the serial communication standards, such as a universal serial bus (USB). Then, the external I/F 26 controls the data transmission/reception with a computer etc. connected via the connection terminal in conformity with the above-described communication standards.

The microphone 27 is provided to record sound outside the electronic camera. The speaker 28 is provided to output sound to the outside of the electronic camera at the time of shooting etc. The microphone 27 and the speaker 28 are connected with the CPU 31.

The flash emitting section 29 includes, for example, a xenon light emitting tube, a main capacitor that stores the energy of light emission, a reflection umbrella to illuminate flash to the subject efficiently, a lens member, a light emission control circuit, etc.

The outer light AF section 30 is a publicly-known passive type focusing device that detects focus by an optical system independent of the shooting lens 11. The outer light AF section 30 has a pair of ranging lenses 30a, mirrors 30b, 30c, and an image sensor 30d. The light from the subject having passed through the pair of ranging lenses 30a is reflected from the mirrors 30b, 30c and then detected as two images on the image sensor 30d.

The CPU 31 controls the operation of each section of the electronic camera in accordance with the sequence program stored in a ROM, not shown, and at the same time, carries out various operations (their content will be described later) necessary for shooting etc. The CPU 31 in the present embodiment serves as an AF controlling section 31a, a face detecting section 31b, a face recognizing section 31c, an inferential section 31d, and a timer 31e that acquires a shooting date and time.

The AF controlling section 31a carries out the publicly-known AF operation in the contrast detection system based on the data of the through image acquired from the image pickup device 15. The AF controlling section 31a calculates a defocus amount based on the distance between the two images detected from the image sensor of the outer light AF section 30 and at the same time, carries out AF based on the defocus amount. In the first embodiment, in the normal shooting mode, the AF controlling section 31a improves the precision of focusing by further carrying out AF in the contrast detection system after carrying out AF with the defocus amount of the outer light AF section 30.

The face detecting section 31b detects the face area, the face size, etc., of the subject by extracting features from the data of the through image or the photographic image. For example, the face detecting section 31b extracts the face area by the feature extracting processing described in Japanese Unexamined Patent Application Publication No. 2001-16573 etc. The above-described features include, for example, the eyebrow, eye, nose, each endpoint of the lip, profile point of the face, parietal point, the lowest point of the jaw, etc.

The face recognizing section 31*c* generates face recognizing data based on the features detected by the face detecting section 31*b*. For example, the face recognizing section 31*c* generates face recognizing data of a registered person, who will be a recognizing target, from the position of the detected face features, the size of the face part determined by the features, the relative distance between the respective features, etc.

The face recognizing section 31*c* performs face recognizing processing to determine whether or not the face of the person in the shooting image plane is the face of the person of the face recognizing data. Specifically, the face recognizing section 31*c* first calculates the position of the feature of the face of the shot person, the size of each face part, the relative distance between each feature and another, etc., based on the detected face features. Then, the face recognizing section 31*c* compares the above-described calculation results and the face recognizing data and finds the degree of similarity between the face of the person of the face recognizing data and the face of the shot person. When the above-described degree of similarity exceeds a threshold value, the face recognizing section 31*c* determines that the shot person coincides with the person of the face recognizing data.

The inferential section 31*d* distinguishes the race, age, gender, etc., by the operation processing using the features that constitute the organs of the face. For the estimation of the race, for example, the technique in document 1 described below can be used, however, in addition to this, a method for detecting the luminance distribution in the face image can also be used. To estimate the age and gender, for example, the method disclosed in document 2 described below can be used.

<Document 1>

Gregory Shakhnarovich, Paul A. Viola, Baback Moghaddam; "A Unified Learning Framework for Real Time Face Detection and Classification"; Proceedings of the Fifth IEEE International Conference on Automatic Face and Gesture and Gesture Recognition; (US), Institute of Electrical and Electronics Engineers, abbreviated to IEEE); May, 2002.

<Document 2>

Satosh Hosoi, Erina Takikawa, Masato Kawade; "Gender and Adult Estimation System with Gabor Wavelet and Support Vector Machine"; the Eighth Image Sensing Symposium Lecture Paper Collection; Image Sensing Technology Research Group; July, 2002.

The feature amount used for the above-described inferential processing is derived mainly from the detection area of the face image, however, this is not limited, and the feature amount of the peripheral area of the face image, the entire image, or part of the image may be included. As the feature amount, the average and variance of the color and lightness of the face image, the intensity distribution, the color difference and lightness difference from the ambient image can be detected. Further, it may also be possible to put these feature amounts into a predetermined calculation expression to find a secondary feature amount necessary for inference.

The second memory 32 is connected with the CPU 31. In the second memory 32, the face recognizing data generated in the face recognizing section 31*c* is recorded. In the second memory 32, a group folder can be generated for each person who is registered (registered person) and the face recognizing data can be grouped for each registered person by the group folder. For example, it is possible to record a plurality of face recognizing data with different face orientations, shooting conditions, etc., for the same registered person in the group folder.

In each group folder of the second memory 32, the property data indicative of the features of the registered person and the setting at the time of shooting can be recorded.

The above-described property data includes (1) the name of the registered person, (2) the date of birth of the registered person, (3) the gender of the registered person, (4) the race of the registered person, (5) the birthplace/language of the registered person, (6) whether he/she wears glasses, (7) the setting of additional display to the photographic image, and (8) the display of a letter(s). It may also be possible to record the telephone number, address, mail address, nickname, etc. of the registered person as the property data.

Here, the setting of additional display in above (7) indicates whether or not to synthesize an additional display on the photographic image. The additional display includes a character of cartoon, stamp of a letter(s) or picture, template, such as a frame that decorates the surrounding of the photographic image, text information such as news on the shooting date. The setting of additional display also includes the setting of position where the additional display is synthesized on the image. The data of the additional display is recorded in the second memory 32. It may also be possible for the CPU 31 to add and update the data of additional display in the second memory 32 by downloading it from, for example, an external server via the communication section 25.

The display of a letter(s) in (8) above is the setting item relating to a letter(s) when the letter(s) is synthesized on the photographic image (display of the shooting date, text information of the above-described additional display, etc.). For example, the kind of font of letter(s) to be synthesized on the photographic image, the size of letter(s), the color of letter(s), and the setting of position where the letter(s) is synthesized on the image are included.

Further, in the second memory 32, the sound data of a cue used to start shooting is recorded. As the sound data, cues in a plurality of languages are recorded, respectively. For one language, the data of cues in two or more patterns, that is, in the standard language and slang are recorded.

Figure 2:
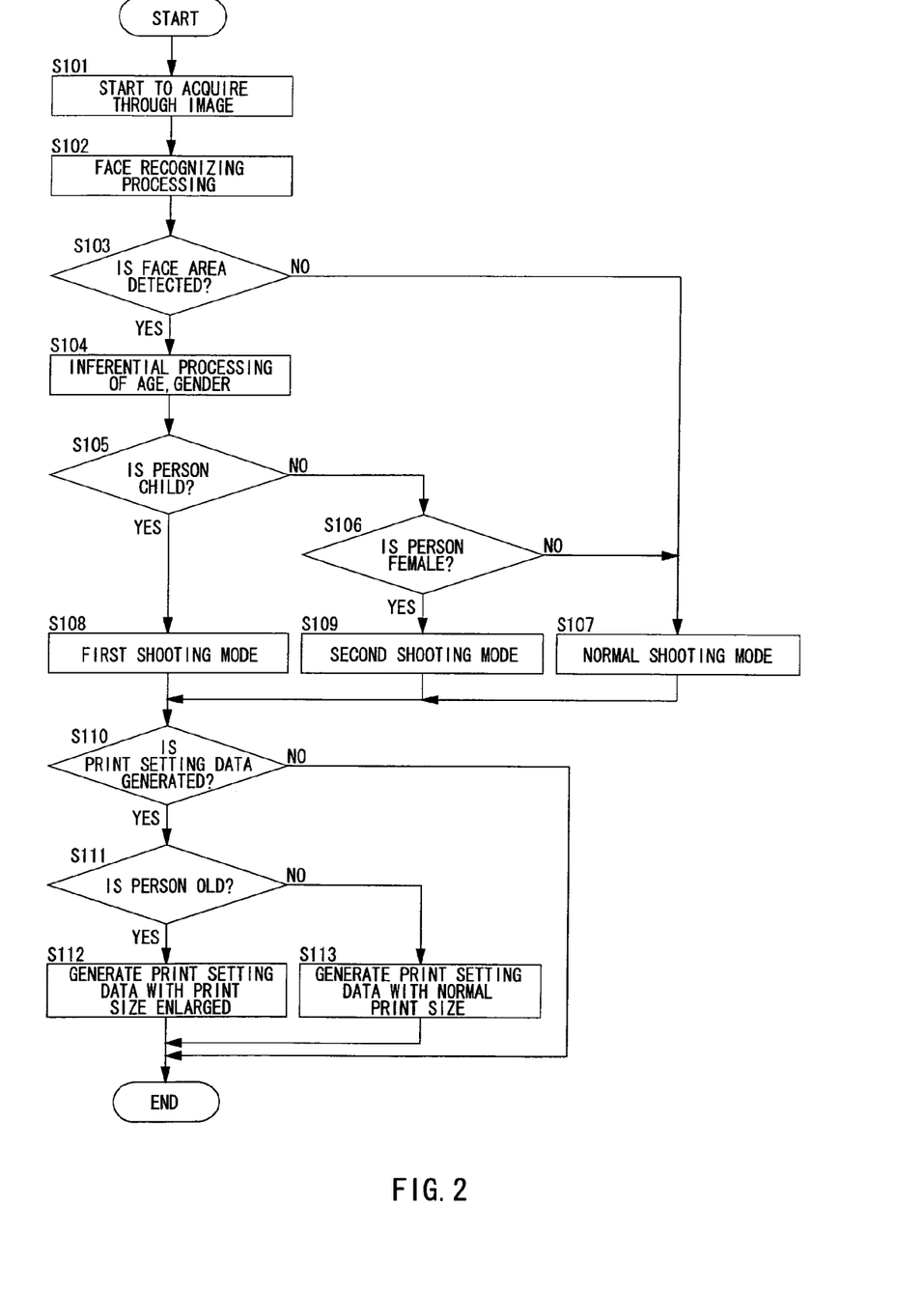
FIG. 2 is a flowchart for illustrating an example of a shooting operation of the electronic camera in the first embodiment.

Next, an example of a shooting operation of the electronic camera in the first embodiment will be described with reference to a flowchart in FIG. 2. In the following description, a case will be described, where the inferential function of the age and gender of a person is set to ON but the face recognizing function is set to OFF.

Step 101: The CPU 31 starts to acquire a through image by driving the image pickup device 15. The image pickup device 15 acquires an image signal of the through image by thin reading at predetermined intervals. The image processing section 20 generates a view image in succession based on the data of the through image. Then, on the monitor 23 during shooting standby, the view image is displayed as a motion image. With the arrangement, it is possible for a user to carry out framing to determine a shooting composition using the view image of the monitor 23.

Step 102: The face detecting section 31*b* of the CPU 31 detects a face area in the photographic image plane by performing the face detecting processing on the data of through image.

Step 103: The CPU 31 determines whether or not a face area is detected by the face detecting processing in S102. When a face area is detected (YES side), the CPU 31 proceeds to S104. On the other hand, when no face area is detected (NO side), the CPU 31 proceeds to S107.

Step 104: The inferential section 31*d* of the CPU 31 performs the inferential processing on the face area in S102 to estimate the age and gender of the main subject. As an example, the CPU 31 sets a plurality of classes for each category of the gender and age of the subject and finds the likelihood for each class. Then, the CPU 31 estimates the age and gender of the main subject based on the class with maximum likelihood.

Here, when a plurality of face areas is detected in S102, the CPU 31 regards either a face area that is largest in size and can be thought to be nearest or a face area located in the most centralized portion as a main subject and performs inferential processing.

Step 105: The CPU 31 determines whether or not the main subject is a child from the age estimated by the inferential processing in S104. Specifically, when the estimated age of the main subject is not more than a threshold value (for example, younger than six years old to ten years old), the main subject is determined to be a child. When the main subject is a child (YES side), the CPU 31 proceeds to S108. On the other hand, when the main subject is not a child (NO side), the CPU 31 proceeds to S106.

Step 106: The CPU 31 determines whether or not the main subject is a female from the gender estimated by the inferential processing in S104. When the main subject is a female (YES side), the CPU 31 proceeds to S109. On the other hand, when the main subject is a male (NO side), the CPU 31 proceeds to S107.

Step 107: In this case, the CPU 31 shoots the subject in the normal shooting mode. In the normal shooting mode, the CPU 31 carries out AF in response to the half press of the release button and at the same time, carries out AE (automatic exposure calculation) to set the shooting condition. After that, the CPU 31 shoots the subject in response to the full press of the release button and the image processing section 20 generates the photographic image data. Then, the CPU 31 records the photographic image data in the recording medium 34 and proceeds to S110. When the face area is detected in S102, it is preferable for the AF controlling section 31*a* of the CPU 31 to carry out AF using the detected face area as a focusing area.

Step 108: In this case, the CPU 31 shoots the subject after switching the shooting mode to a first shooting mode suitable for shooting a child. In the first shooting mode, the CPU 31 shoots substantially in the same manner as in the normal shooting mode in S107 except in that the CPU 31 carries out any of controls in (1) to (11) below.

(1) The CPU 31 makes a correction to shorten the exposure time than in the normal shooting mode when setting the shooting condition. By shortening the exposure time as described above, it is possible to suppress the blurring of the subject resulting from the movement of the child.

For example, in the first shooting mode, the CPU 31 increases the imaging sensitivity than in the normal shooting mode and at the same time, shortens the exposure time by reducing the aperture value. Obviously, it may also be possible to shorten the exposure time by making only one of the corrections to the imaging sensitivity and the aperture value.

(2) The CPU 31 increases the aperture value than in the normal shooting mode to increase the depth of field when setting the shooting condition. When shooting a child, there are some cases where focusing may be difficult because the child moves, however, the possibility of shooting error can be reduced by increasing the depth of field. It is possible for a user to switch alternately between the settings in (1) and (2) above by the operation using the operation section 24.

(3) The CPU 31 moves the shooting lens 11 to a position suitable for close-range shooting. This is because the camera is frequently put close to a person for close-range shooting, in particular, when shooting a baby.

(4) The CPU 31 performs setting so as to cause the flash emitting section 29 to emit light and at the same time, to output sound from the speaker 28 immediately before starting exposure. This is to prevent shooting error by calling the child's attention to the electronic camera when shooting.

(5) The CPU 31 prohibits the flash emitting section 29 from emitting light and makes a setting to turn off the sound output from the speaker 28 when shooting. This is because, for example, to prevent a child from waking up due to the flash or shooting noises when shooting the child while sleeping. It is possible for a user to switch alternately between the settings in (4) and (5) above by the operation using the operation section 24.

(6) The AF controlling section 31*a* of the CPU 31 carries out AF only at the outer light AF section 30. That is, in the first shooting mode, it is possible for the CPU 31 not to carry out AF in the contrast detection system that takes time for focusing. With the arrangement, AF is carried out quickly, and therefore, the possibility of missing the best moment for shooting is reduced.

(7) The CPU 31 estimates the expression of the face area of the main subject. Then, the CPU 31 makes it possible to shoot the main subject only when the expression of the main subject is in a predetermined state (for example, a state where the eyes are not closed or a state of a smiling face). With the arrangement, it is possible for a user to obtain a photographic image when the expression of the main subject is in a desired state and the possibility of shooting error is reduced.

Here, the detection of the expression of the face described above is performed by the following means. For example, as in Japanese Unexamined Patent Application Publication No. 2004-272933, face images for learning classified into classes, such as usual expressions, faces with eyes closed, faces with mouth open, smiling faces, etc., may be prepared in advance, and then the CPU 31 determines the expression of a face with an evaluation value set for each class after having made an identification based on the canonical discriminant analysis. Alternatively, the standard patterns, such as open eyes, closed eyes, open mouth, closed mouth, etc., may be prepared in advance, and then the CPU 31 matches the face area with each pattern and estimates the expression from a combination of patterns.

(8) The CPU 31 carries out continuous shooting of a plurality of frames with one-time full press of the release button. With the arrangement, since it is possible for a user to select the best image from a plurality of photographic images, the possibility of shooting error is reduced.

(9) The CPU 31 makes a sound recording using the microphone 27 when shooting. For example, the CPU 31 makes a sound recording before or after the shooting of a photographic image and records the photographic image data associated with the sound recording data. With the arrangement, it is also made possible to grasp the circumstance of the shot scene by the sound.

(10) The CPU 31 instructs the image processing section 20 to perform the soft focus processing on the photographic image. With the arrangement, a child, who is the main subject, can be enhanced and at the same time, a soft, preferable photographic image can be obtained.

Here, the soft focus processing of the image processing section 20 is performed by the following means. For example, the image processing section 20 generates a soft focus image by applying filtering processing to the photographic image with a filter that exhibits a predetermined soft focus effect or low pass filter. Further, the image processing section 20 may generate a mask image from the photographic image and at the same time generate a soft focus image by synthesizing an image after the filtering processing and the original image based on the mask image.

(11) The CPU 31 instructs the image processing section 20 to perform synthesizing processing of additional display. Then, the image processing section 20 synthesizes a character of cartoon or news on the shooting date on the photographic image. With the arrangement, it is possible to provide a user with a photographic image with high entertainment.

Step 109: In this case, the CPU 31 switches the mode to a second shooting mode suitable for shooting a female and shoots the subject. In the second shooting mode, the CPU 31 shoots substantially in the same manner as in the normal shooting mode in S107 except in that the CPU 31 carries out any of controls in (1) to (4) below.

(1) The CPU 31 instructs the image processing section 20 to perform exposure correction processing to correct the exposure of the photographic image to the over side. With the arrangement, a preferable photographic image in which the skin of the female, who is the main subject, is represented white can be obtained.

(2) The CPU 31 instructs the image processing section 20 to perform the soft focus processing on the photographic image. With the arrangement, a female, who is the main subject, can be enhanced and at the same time, a soft, preferable photographic image can be obtained. Further, a preferable photographic image in which the wrinkles and chapped skin of the female, who is the main subject, are inconspicuous can be obtained. The description of the soft focus processing is the same as that in S107 described above, and therefore, its duplicated description is omitted.

(3) The CPU 31 instructs the image processing section 20 to correct the parameter of the color saturation of the photographic image. For example, the image processing section 20 makes a correction to reduce the color saturation in the area of the skin color and thus the skin is represented white. Alternatively, the image processing section 20 may make a correction to increase the color saturation in the area of skin color to make the dark spot of the skin more inconspicuous.

(4) The CPU 31 instructs the image processing section 20 to make a correction to make the person of the photographic image look slim. With the arrangement, a preferable photographic image in which the female, who is the main subject, looks slim can be obtained.

Here, the processing to make the shot person look slim is performed by the following means. For example, after having changed the aspect ratio of the photographic image so that the image is somewhat elongated longitudinally, the image processing section 20 trims the image to adjust the image size. Alternatively, as in Japanese Unexamined Patent Application Publication No. 2004-264893, the image processing section 20 may make a correction to the profile of the face by image processing to make the cheek look thin.

Step 110: The CPU 31 determines whether or not the generation of print setting data conforming to the DPOF (Digital Print Order Format) standards is set to ON. When the above-described setting is set to ON (YES side), the CPU 31 proceeds to S111. On the other hand, when the setting is set to OFF (NO side), the CPU 31 ends the shooting operation without generating the print setting data.

Step 111: The CPU 31 determines whether or not the main subject is an old person from the age estimated by the inferential processing in S104. Specifically, the CPU 31 determines that the main subject is an old person if the estimated age of the main subject is not less than a threshold value (for example, 60 years old or older). When the main subject is an old person (YES side), the CPU 31 proceeds to S112. On the other hand, when the face area is not detected or the main subject is not an old person (NO side), the CPU 31 proceeds to S113.

Step 112: The CPU 31 generates print setting data by changing the print size to a larger size than in the normal printing. For example, when the standard print size is L size, the CPU 31 generates print setting data by changing its print size to 2 L size. With the arrangement, a photographic image that is easy-to-see for an old person can be printed by the print setting data.

Step 113: The CPU 31 generates the print setting data with the normal print size. For example, when the standard print size is L size, the CPU 31 generates the print setting data with the print size of L size. The description of the shooting operation of the electronic camera in the first embodiment is completed as above.

Description of Second Embodiment

Figure 3:
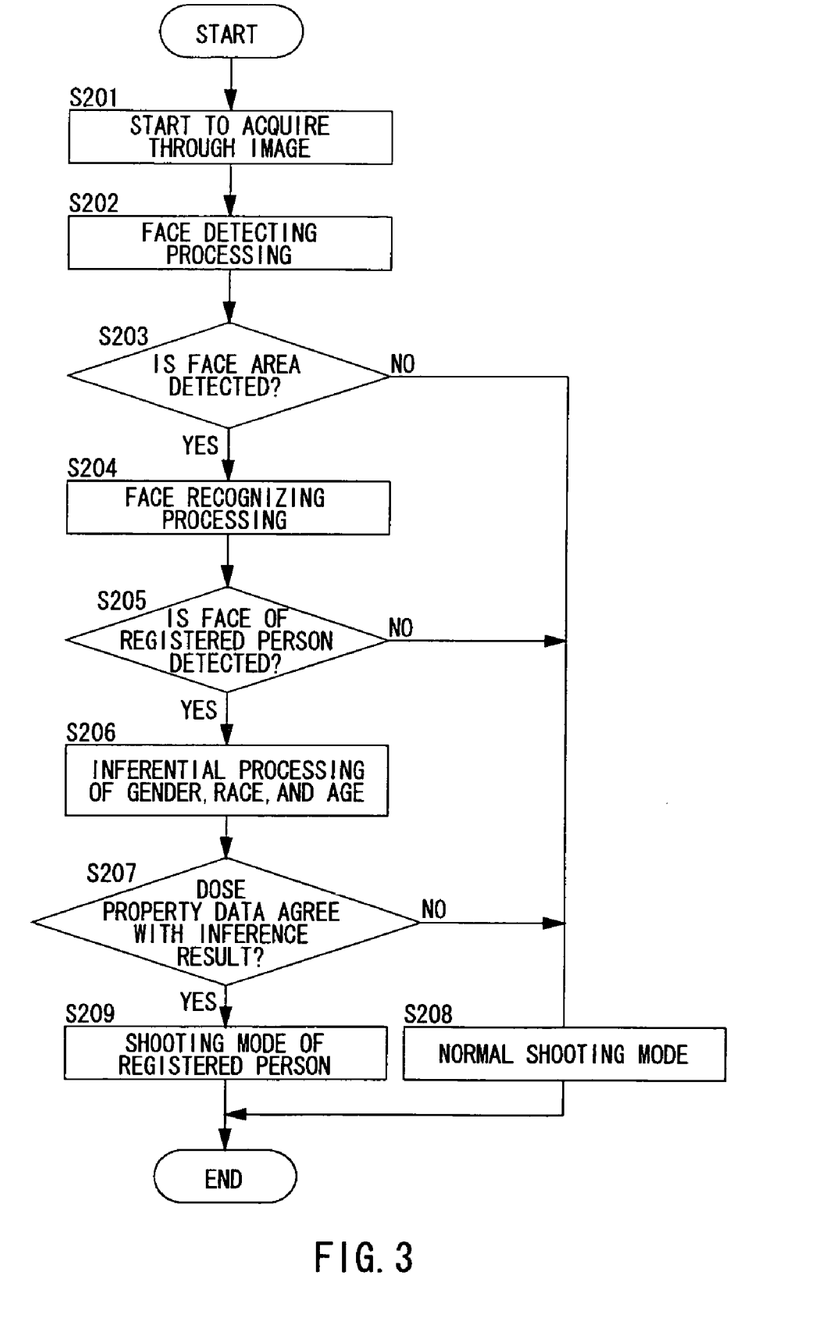
FIG. 3 is a flowchart for illustrating an example of a shooting operation of an electronic camera in a second embodiment.

FIG. 3 is a flowchart for illustrating an example of a shooting operation of an electronic camera in a second embodiment. The second embodiment is a case where a registered person is recognized with the inferential function of the age and gender of a person and the face recognizing function being set to ON.

Since the basic configuration of the electronic camera in the second embodiment is common to that in the first embodiment, its duplicated description is omitted here. S201, S202 in FIG. 3 correspond to S101, S102, respectively, in the first embodiment, and therefore, their duplicated description is omitted.

Step 203: The CPU 31 determines whether or not a face area is detected by the face detecting processing in S202. When a face area is detected (YES side), the CPU 31 proceeds to S204. On the other hand, when a face area is not detected (NO side), the CPU 31 proceeds to S208.

Step 204: The face recognizing section 31c of the CPU 31 performs face recognizing processing to detect the face of a registered person, who is a recognizing target, from the above-described face area based on the data of features acquired by the face detecting processing in S202 and the face recognizing data in the second memory 32.

Here, in the face recognizing processing in S204, the CPU 31 corrects the threshold of the determination criterion of the face recognizing processing for each registered person based on the property data in the second memory 32. For example, for a registered person, who is indicated as a female by the gender of the property data, the CPU 31 makes a correction to reduce the threshold value of the determination criterion so as to raise the possibility that the person in the face area is determined to be a registered person. This is because, in the case of a female, the rate of correct face recognition may be reduced due to the changes in makeup, hair style, etc. Further, for a registered person indicated to wear glasses by the property data, the CPU 31 makes a correction to reduce the threshold value of the determination criterion so as to raise the possibility that the person in the face area is determined to be a registered person. This is because, in the case of a person who wears glasses, the rate of correct face recognition may be reduced due to whether glasses are worn or not or the change of glasses.

Step 205: The CPU 31 determines whether or not the face of a registered person is detected by the face recognizing processing in S204. When the face of the registered person is detected (YES side), the CPU 31 proceeds to S206. On the other hand, when the face of the registered person is not detected (NO side), the CPU 31 proceeds to S208.

Step 206: The inferential section 31d of the CPU 31 performs the inferential processing to estimate the gender, race, and age of the subject for the face area regarded to be a registered person in S204. As an example, the CPU 31 sets a plurality of classes for each category of the gender, race, and age of the subject and finds the likelihood for each class. Then, the CPU 31 estimates the gender, race, and age of the subject based on the class with maximum likelihood.

Step 207: The CPU 31 determines whether or not the property data in the second memory 32 coincides with the gender, race, and age estimated in S206. For example, the CPU 31 calculates an evaluation value indicative of the degree of agreement between the estimation result in S206 and the property data with respect to the gender, race, and age of the subject. Then, when the evaluation value is not less than a threshold value, the CPU 31 determines that the face area in S204 agrees with the registered person. When both agree with each other (YES side), the CPU 31 proceeds to S209. On the other hand, when both do not agree with each other (NO side), the CPU 31 proceeds to S208.

Step 208: In this case, the CPU 31 shoots the subject in the normal shooting mode. In the normal shooting mode, the CPU 31 carries out AF in response to the half press of the release button and at the same time, carries out AE to set the shooting condition. After that, the CPU 31 shoots the subject in response to the full press of the release button and the image processing section 20 generates the photographic image data. Then, the CPU 31 records the photographic image data in the recording medium 34. When the face area is detected in S202, it is preferable for the AF controlling section 31a of the CPU 31 to carry out AF regarding the detected face area as a focusing area.

Step 209: In this case, the CPU 31 switches to a shooting mode of the registered person and shoots the subject. In this shooting mode of the registered person, the CPU 31 shoots substantially in the same manner as in the normal shooting mode in S208 except in that the CPU 31 reads the property data of the registered person detected in S204 from the second memory 32 and carries out any of controls in (1) to (4) below based on the property data.

(1) The CPU 31 causes the speaker 28 to output a cue for shooting at the time of shooting. Here, the CPU 31 changes the above-described cue based on the property data of the registered person. Specifically, the CPU 31 selects sound data to reproduce from the sound data in the second memory 32 based on the birthplace/language of the registered person of the property data. For example, when the language of the property data indicates English, the CPU 31 reproduces the sound data of a cue in English. When a plurality of slang cues is set for one language, it may also be possible for the CPU 31 to reproduce the sound data of the slang corresponding to the birthplace based on the birthplace of the registered person of the property data. With the arrangement, it is possible to transfer the cue for shooting in an easy-to-see manner to the registered person, who is the main subject.

(2) The CPU 31 instructs the image processing section 20 to display the shooting date. The image processing section 20 synthesizes the shooting date (year/month/day) acquired from the timer 31e on a predetermined position of the photographic image. Here, the CPU 31 changes the display order of the year, month, and day based on the property data of the registered person. For example, when the language of the registered person of the property data is Japanese, the CPU 31 displays the shooting date in the order of the year, month, and day. When the language of the registered person of the property data is English, the CPU 31 displays the shooting date in the order of the day, month, and year, or the month, day, and year. With the arrangement, it is possible to provide a photographic image on which the date is displayed in an easy-to-see manner for the registered person, who is the main subject.

(3) The CPU 31 adds the number of years and months calculated from the birthday based on the registered person's date of birth. For example, the CPU 31 instructs the image processing section 20 to perform image processing to synthesize a letter(s) indicative of age (for example, xx years old, x months after birth, etc.) on the photographic image. Alternatively, it may also be possible for the CPU 31 to record the data of years and months calculated from the birthday in the photographic image data. With the arrangement, it is easy to grasp the growth of the registered person, who is the main subject, and a photographic image suitable for album edition etc. can be provided.

(4) The CPU 31 instructs the image processing section 30 to perform synthesizing processing of an additional display. Then, the image processing section 20 synthesizes a character specified to each registered person in the property data on the photographic image. It is also possible for the image processing section 20 to change the synthesizing position of an additional display for each registered person based on the property data. With the arrangement, it is possible to provide a user a photographic image with high entertainment.

When a letter(s), such as the shooting date, is synthesized on the photographic image in S209, the image processing section 20 changes the font, color, size, and synthesizing position of the letter(s) for each registered person based on the display items of the letter(s) in the property data. The description of the shooting operation of the electronic camera in the second embodiment is completed as above.

With the electronic camera in the second embodiment described above, the face recognizing processing is performed based on the feature amount detected from the face area and at the same time, the race, age, and gender estimated from the face area are collated with the property data and the validity of the result of face recognition is checked. Consequently, it is possible to further improve the precision of face recognizing processing.

In the second embodiment described above, the threshold value of the determination criterion for the face recognizing processing is corrected for each registered person based on the information of the property data, such as the gender and presence or absence of glasses. Consequently, it is possible to reduce the possibility that the registered person is not detected in the face recognizing processing.

(Supplementary Items of Embodiments)

(1) In the second embodiment, the example is described, in which the processing to estimate the race, age, gender, etc., of the subject is performed together with the face recognizing processing, however, in the present invention, it is possible to omit the processing to estimate the race etc. of the subject.

(2) The processing in the shooting mode of the registered person in the second embodiment is just an example. For example, it may also be possible to record the shooting condition at the time of shooting, the setting of image processing, the setting of automatic image transmission via an electronic mail, etc., in the second memory 32 as the property data for each registered person. Then, it is possible for the CPU 31 to automatically set the shooting condition and image processing based on the property data at the time of face recognition or to automatically transmit the data of the photographic image to a predetermined address after the shooting.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is no desired to limit the inventive embodiments to exact construction and operation illustrated and described, and accordingly all suitable modifications and equivalents may be resorted to, falling within the scope thereof.

The invention claimed is:

1. An electronic camera comprising:
   an image pickup device that takes an image of a subject;
   a face detecting section that detects a face area in a shooting image plane based on an output of the image pickup device and extracts a feature amount of a face of the subject from the face area;
   an inferential section that performs inferential processing of at least one of an age and a gender of the subject based on the feature amount;
   an image processing section that performs at least one of an exposure correction, a soft focus correction, a skin smoothing correction to adjust color saturation of a skin color, and a correction to make a person look slim, on a recording-purpose image of the subject taken by the image pickup device when the gender of the subject inferred by the inferential section is a female, or when the age of the subject inferred by the inferential section is not more than a threshold value; and
   a record controlling section that records the corrected recording-purpose image as the recording-purpose image.

2. An electronic camera comprising:
   an image pickup device that takes an image of a subject;
   a face detecting section that detects a face area in a shooting image plane based on an output of the image pickup device and extracts a feature amount of a face of the subject from the face area;
   an inferential section that performs inferential processing of an age of the subject based on the feature amount; and
   a controlling section that makes a correction to make an exposure time short when shooting a recording-purpose image of the subject by the image pickup device, when the age of the subject inferred by the inferential section is not more than a threshold value.

3. The electronic camera according to claim 2, further-comprising:
   an image processing section that performs a soft focus correction on the recording-purpose image when the age of the subject inferred by the inferential section is not more than the threshold value; and
   a record controlling section that records the corrected recording-purpose image as the recording-purpose image.

4. An electronic camera comprising:
   an image pickup device that takes an image of a subject;
   a face detecting section that detects a face area in a shooting image plane based on an output of the image pickup device and extracts a feature amount of a face of the subject from the face area;
   an inferential section that performs inferential processing of an age of the subject based on the feature amount;
   an aperture section that controls an amount of incident light from a field; and
   a controlling section that controls the aperture section to make a correction to increase a depth of field when shooting a recording-purpose image of the subject by the image pickup device, when the age of the subject inferred by the inferential section is not more than a threshold value.

5. The electronic camera according to claim 4, further comprising:
   an image processing section that performs a soft focus correction on the recording-purpose image when the age of the subject inferred by the inferential section is not more than the threshold value; and
   a record controlling section that records the corrected recording-purpose image as the recording-purpose image.

6. An electronic camera comprising:
   an image pickup device that takes an image of a subject;
   a face detecting section that detects a face area in a shooting image plane based on an output of the image pickup device and extracts a feature amount of a face of the subject from the face area;
   an inferential section that performs inferential processing of an age of the subject based on the feature amount;
   a shooting lens;
   a lens driving section that adjusts a position of the shooting lens in an optical axis direction; and
   a controlling section that moves the shooting lens to a position suitable for close-range shooting when shooting a recording-purpose image of the subject by the image pickup device, when the age of the subject inferred by the inferential section is not more than a threshold value.

7. The electronic camera according to claim 6, further comprising:
   an image processing section that performs a soft focus correction on the recording-purpose image when the age of the subject inferred by the inferential section is not more than the threshold value; and
   a record controlling section that records the corrected recording-purpose image as the recording-purpose image.

8. An electronic camera comprising:
   an image pickup device that takes an image of a subject;
   a face detecting section that detects a face area in a shooting image plane based on an output of the image pickup device and extracts a feature amount of a face of the subject from the face area;
   an inferential section that performs inferential processing of an age of the subject based on the feature amount;
   a flash emitting section that illuminates the subject when shooting;
   a speaker that outputs sound; and
   a controlling section that causes the flash emitting section to emit light and outputs the sound from the speaker when shooting a recording-purpose image of the subject by the image pickup device, when the age of the subject inferred by the inferential section is not more than a threshold value.

9. The electronic camera according to claim 8, further comprising:
   an image processing section that performs a soft focus correction on the recording-purpose image when the age of the subject inferred by the inferential section is not more than the threshold value; and
   a record controlling section that records the corrected recording-purpose image as the recording-purpose image.

10. An electronic camera comprising:
    an image pickup device that takes an image of a subject;
    a face detecting section that detects a face area in a shooting image plane based on an output of the image pickup device and extracts a feature amount of a face of the subject from the face area;
    an inferential section that performs inferential processing of an age of the subject based on the feature amount;
    a flash emitting section that illuminates the subject when; shooting;

a speaker that outputs sound; and controlling section that prevents the flash emitting section from emitting light and turns off the output of the speaker when shooting a recording-purpose image of the subject by the image pickup device, when the age of the subject inferred by the inferential section is not more than a threshold value.

11. The electronic camera according to claim 10, further comprising:

an image processing section that performs a soft focus correction on the recording-purpose image when the age of the subject inferred by the inferential section is not more than the threshold value; and a record controlling section that records the corrected recording-purpose image as the recording-purpose image.

12. An electronic camera comprising:

an image pickup device that takes an image of a subject;

a face detecting section that detects a face area in a shooting image plane based on an output of the image pickup device and extracts a feature amount of a face of the subject from the face area;

an inferential section that performs inferential processing of an age of the subject based on the feature amount;

an expression estimating section that estimates an expression of the face of the subject based on the output of the image pickup device; and a controlling section that permits shooting a recording-purpose image of the subject by the image pickup device when the expression is in a predetermined state, when the age of the subject inferred by the inferential section is not more than a threshold value.

13. The electronic camera according to claim 12, further comprising:

an image processing section that performs a soft focus correction on the recording-purpose image when the age of the subject inferred by the inferential section is not more than the threshold value; and a record controlling section that records the corrected recording-purpose image as the recording-purpose image.

14. An electronic camera comprising:

an image pickup device that takes an image of a subject;

a face detecting section that detects a face area in a shooting image plane based on an output of the image pickup device and extracts a feature amount of a face of the subject from the face area;

an inferential section that performs inferential processing of an age of the subject based on the feature amount;

a first focusing section that i) performs a focusing operation by calculating a focus evaluation value of the image of the subject based on the output of the image pickup device and ii) searches for a lens position at which the focus evaluation value becomes a local maximum;

a second focusing section that performs a focusing operation in a manner different from that of the first focusing section; and a controlling section that performs the focusing operation the second focusing section when shooting a recording-purpose image of the subject by the image pickup device, when the age of the subject inferred by the inferential section is not more than a threshold value.

15. The electronic camera according to claim 14, further comprising:

an image processing section that performs a soft focus correction on the recording-purpose image when the age of the subject inferred by the inferential section is not more than the threshold value; and a record controlling section that records the corrected recording-purpose image as the recording-purpose image.

16. An electronic camera comprising:

an image pickup device that takes an image of a subject;

a face detecting section that detects a face area in a shooting image plane based on an output of the image pickup device and extracts a feature amount of a face of the subject from the face area;

an inferential section that performs inferential processing of an age of the subject based on the feature amount;

a controlling section that switches to a shooting mode in which continuous shooting of a recording-purpose image of the subject by the image pickup device is performed, when the age of the subject inferred by the inferential section is not more than a threshold value.

17. The electronic camera according to claim 16, further comprising:

an image processing section that performs a soft focus correction on the recording-purpose image when the age of the subject inferred by the inferential section is not more than the threshold value; and a record controlling section that records the corrected recording-purpose image as the recording-purpose image.

18. An electronic camera comprising:

an image pickup device that takes an image of a subject;

a face detecting section that detects a face area in a shooting image plane based on an output of the image pickup device and extracts a feature amount of a face of the subject from the face area;

an inferential section that performs inferential processing of an age of the subject based on the feature amount;

a microphone that records external sound; and a controlling section that switches to a shooting mode which performs shooting of a recording-purpose image of the subject by the image pickup device and performs recording of the external sound by the microphone, when the age of the subject inferred by the inferential section is not more than a threshold value.

19. The electronic camera according to claim 18, further comprising:

an image processing section that performs a soft focus correction on the recording-purpose image when the age of the subject inferred by the inferential section is not more than the threshold value; and a record controlling section that records the corrected recording-purpose image as the recording-purpose image.

20. An electronic camera comprising:

an image pickup device that takes an image of a subject;

a face detecting section that detects a face area in a first image of the subject taken by the image pickup device and extracts a feature amount of a face of the subject from the face area;

an inferential section that performs inferential processing of at least one of an age and a gender of the subject based on the feature amount;

a controller section that instructs the image pickup device to take a second image of the subject after the inferential processing on the first image of the subject has been completed;

a memory that records data including at least one of an image of character and text information; and an image processing section that generates a composite image from the data recorded in the memory and the second image based on the inference result of the inferential section.

21. An electronic camera comprising:
an image pickup device that takes an image of a subject;
a face detecting section that detects a face area in a first image of the subject taken by the image pickup device and extracts a feature amount of a face of the subject from the face area;
an inferential section that performs inferential processing of an age of the subject based on the feature amount; and
a controlling section that i) instructs the image pickup device to take a second image of the subject after the inferential processing on the first image of the subject has been completed, ii) generates print data including a print size for carrying out printing of the second image, and iii) changes the print size to a larger print size than a predetermined print size when the age of the subject inferred by the inferential section is more than a threshold value.

22. An electronic camera, comprising:
an image pickup device that takes an image of a subject;
a memory that records a correspondence relation between registration data indicative of a feature amount of a face of a specific person and property data relating to at least one of a gender, a race, and an age of the specific person;
a face detecting section that detects a face area in a first image of the subject taken by the image pickup device and extracts a feature amount of a face of the subject from the face area;
an inferential section that performs inferential processing of at least one of an age and a gender of the subject based on the feature amount detected by the face detecting section;
a first face recognizing section that determines whether or not the face detected in the first image by the face detecting section corresponds to the specific person based on the feature amount extracted by the face detecting section and the registration data recorded on the memory;
a second face recognizing section that determines whether or not the face detected in the first image by the face detecting section corresponds to the specific person based on the inference result of the inferential section and the property data recorded on the memory; and
a controlling section that switches to a shooting mode in which shooting of a second image of the subject is performed based on the property data recorded on the memory, when the face detected in the first image is recognized as the specific person by the first face recognizing section and the second face recognizing section.

23. An electronic camera comprising:
an image pickup device that takes an image of a subject;
a memory that records a correspondence relation between registration data indicative of a feature amount of a face of a recognizing target and property data relating to one of a birthplace and language used by a person of the recognizing target;
a face detecting section that detects a face area in a shooting image plane based on an output of the image pickup device and extracts the feature amount of the face of the subject from the face area;
a face recognizing section that determines whether or not the face area is the recognizing target based on data of the feature amount corresponding to the face area and the registration data;
a speaker that outputs sound; and
a controlling section that causes the speaker to output a cue determined in accordance with the property data when shooting based on a recognition result of the face recognizing section.

24. An electronic camera comprising:
an image pickup device that takes an image of a subject;
a memory that records a correspondence relation between registration data indicative of a feature amount of a face of a recognizing target and property data relating to one of a birthplace and language used by a person of the recognizing target;
a face detecting section that detects a face area in a shooting image plane based on an output of the image pickup device and extracts the feature amount of the face of the subject from the face area;
a face recognizing section that determines whether or not the face area is the recognizing target based on data of the feature amount corresponding to the face area and the registration data;
a timer that acquires a shooting date and time;
an image processing section that performs image processing to generate a display of the shooting date for a recording-purpose image taken by the image pickup device based on a recognition result of the face recognizing section; and
a controlling section that changes a display order of the shooting date based on the property data.

25. An electronic camera comprising:
an image pickup device that takes an image of a subject;
a memory that records a correspondence relation between registration data indicative of a feature amount of a face of a recognizing target and property data of a gender of the recognizing target;
a face detecting section that detects a face area in a first image of the subject taken by the image pickup device and extracts a feature amount of the face of the subject from the face area;
a face recognizing section that determines whether or not the face detected in the first image by the face detecting section corresponds to the recognizing target based on the feature amount extracted by the face detecting section and the registration data recorded on the memory; and
a controlling section that makes a correction to relax a criterion for which the face in the first image is determined to be the recognizing target in the determination when the property data indicates that the gender of the recognizing target is a female, and instructs the image pickup device to take a second image of the subject after the determination by the face recognizing section has been completed under the corrected criterion.

26. An electronic camera comprising:
an image pickup device that takes an image of a subject;
a memory that records a correspondence relation between registration data indicative of a feature amount of a face of a recognizing target and property data relating to a gender of a person of the recognizing target;
a face detecting section that detects a face area in a shooting image plane based on an output of the image pickup device and extracts the feature amount of the face of the subject from the face area;
a face recognizing section that determines whether or not the face area is the recognizing target based on data of the feature amount corresponding to the face area and the registration data; and
a controlling section that makes a correction to relax a criterion with which the face area is determined to be the recognizing target in the determination when the property data indicates a person who wears glasses.

27. An electronic camera comprising:

an image pickup device that takes an image of a subject;

a memory that records a correspondence relation between registration data indicative of a feature amount of a face of a recognizing target and property data relating to a birthday of the recognizing target;

a face detecting section that detects a face area in a first image of the subject taken by the image pickup device and extracts the feature amount of the face of the subject from the face area;

a face recognizing section that determines whether or not the face detected in the first image by the face detecting section corresponds to the recognizing target based on the feature amount extracted by the face detecting section and the registration data recorded on the memory;

a timer that acquires date and time of shooting by the image pickup device; and a controlling section that i) instructs the image pickup device to take a second image of the subject after the determination by the face recognizing section has been completed, ii) creates data relating to a number of years and months calculated from the birthday based on the date and time of shooting acquired by the timer, and iii) generates a composite image from the information and the second image of the subject taken by the image pickup device based on a the recognition result of the face recognizing section.

28. An electronic camera comprising:

an image pickup device that takes an image of a subject;

a memory that records data of an additional display including one of an image of character and text information and records a correspondence relation between registration data indicative of a feature amount of a face of a recognizing target and property data indicative of the additional display corresponding to the recognizing target;

a face detecting section that detects a face area in a shooting image plane based on an output of the image pickup device and extracts the feature amount of the face of the subject from the face area;

a face recognizing section that determines whether or not the face area is the recognizing target based on data of the feature amount corresponding to the face area and the registration data; and an image processing section that performs image processing to generate the additional display indicated by the property data for a recording-purpose image taken by the image pickup device based on a recognition result of the face recognizing section.

29. The electronic camera according to claim 28, wherein:

the property data includes at least one of first data that specifies a kind of the additional display and second data that specifies a generating position of the additional display; and image processing section changes at least one of the kind of the additional display and the generating position of the additional display in accordance with the recognizing target based on the property data.

30. An electronic, camera comprising:

an image pickup device that takes an image of a subject;

a memory that records a correspondence relation between registration data indicative of a feature amount of a face of a recognizing target and property data relating to at least one of a display setting of text information and a generating position of the text information generated on the image when a person of the recognizing target is shot;

a face detecting section that detects a face area in a shooting image plane based on an output of the image pickup device and extracts the feature amount of the face of the subject from the face area;

a face recognizing section that determines whether or not the face area is the recognizing target based on data of the feature amount corresponding to the face area and the registration data corresponding to the face area;

an image processing section that performs image processing to generate the text information for a recording-purpose image taken by the image pickup device based on a recognition result of the face recognizing section; and a controlling section that changes the at least one of a display setting and the generating position of the text information in accordance with the recognizing target based on the property data.

* * * * *